US012732058B2

(12) United States Patent
Heinz et al.

(10) Patent No.: US 12,732,058 B2
(45) Date of Patent: Sep. 8, 2026

(54) COOLING ASSEMBLY, INSERT AND DRIVE ASSEMBLY HAVING A COOLING ASSEMBLY OF THIS KIND

(71) Applicant: Joma-Polytec GmbH, Bodelshausen (DE)

(72) Inventors: Stefan Heinz, Bodelshausen (DE); Simon Kümmerle, Mössingen (DE)

(73) Assignee: Joma-Polytec GmbH, Bodelshausen (DE)

( * ) Notice: Subject to any disclaimer, the term of this patent is extended or adjusted under 35 U.S.C. 154(b) by 151 days.

(21) Appl. No.: 18/280,831

(22) PCT Filed: Nov. 24, 2022

(86) PCT No.: PCT/EP2022/083104
§ 371 (c)(1), (2) Date: Sep. 7, 2023

(87) PCT Pub. No.: WO2023/094512
PCT Pub. Date: Jun. 1, 2023

(65) Prior Publication Data

US 2024/0162777 A1 May 16, 2024

(30) Foreign Application Priority Data

Nov. 25, 2021 (DE) ..................... 10 2021 130 968.9

(51) Int. Cl.
*H02K 5/20* (2006.01)

(52) U.S. Cl.
CPC .................................... *H02K 5/203* (2021.01)

(58) Field of Classification Search
CPC ............. H02K 5/203; H02K 5/20; H02K 5/18
See application file for complete search history.

(56) References Cited

U.S. PATENT DOCUMENTS

2011/0083834 A1 4/2011 Braun et al.
2012/0161553 A1 6/2012 Kao et al.
(Continued)

FOREIGN PATENT DOCUMENTS

CN 106208496 A 12/2016
CN 108306444 A 7/2018
(Continued)

OTHER PUBLICATIONS

DE_102016216019_A1 translation (Year: 2016).*
(Continued)

*Primary Examiner* — Oluseye Iwarere
*Assistant Examiner* — Nicholas Lee Setzer
(74) *Attorney, Agent, or Firm* — Harness, Dickey & Pierce, P.L.C.

(57) ABSTRACT

The invention relates to a cooling assembly for a drive assembly, which comprises an electrical machine, for a vehicle, for cooling the electrical machine, the cooling assembly comprising a cooling channel, with an inlet and an outlet, for conducting a cooling medium, the cooling channel having a receiving region for receiving the electrical machine, the cooling assembly comprising an insert having at least one insertion part for generating turbulence in the cooling medium, the insert being arranged in a space surrounding the receiving region for the electrical machine within the cooling channel, and the insertion part having a two-part design. The invention also relates to an insert and a drive assembly having a cooling assembly of this kind and an electrical machine.

15 Claims, 5 Drawing Sheets

(56) References Cited

U.S. PATENT DOCUMENTS

| | | | | |
|---|---|---|---|---|
| 2016/0056683 | A1* | 2/2016 | Nakanishi | H02K 5/18<br>310/54 |
| 2016/0294231 | A1* | 10/2016 | Andres | H02K 5/18 |
| 2017/0012504 | A1* | 1/2017 | Sever | H02K 15/14 |
| 2018/0278119 | A1* | 9/2018 | Carrillo | H02K 5/18 |
| 2018/0320998 | A1* | 11/2018 | Wang | H02K 5/203 |
| 2021/0036590 | A1* | 2/2021 | Bott | H02K 5/20 |
| 2021/0107664 | A1* | 4/2021 | Rabbi | H02K 1/2753 |
| 2021/0234436 | A1* | 7/2021 | Leisinger | H02K 9/197 |
| 2022/0140697 | A1* | 5/2022 | Pawar | H02K 5/203<br>310/53 |
| 2025/0038614 | A1* | 1/2025 | Ono | H02K 5/203 |

FOREIGN PATENT DOCUMENTS

| | | | | |
|---|---|---|---|---|
| DE | 102012002024 | B3 | 5/2013 | |
| DE | 102016207232 | A1 | 11/2017 | |
| DE | 102016210302 | A1 | 12/2017 | |
| DE | 102016216019 | A1 * | 3/2018 | H02K 5/203 |
| DE | 102018212794 | A1 | 2/2020 | |
| DE | 102018220183 | A1 | 6/2020 | |
| DE | 102019202253 | A1 | 8/2020 | |
| JP | 2020-058219 | A | 4/2020 | |
| WO | WO-2009/053496 | A2 | 4/2009 | |

OTHER PUBLICATIONS

International Search Report from corresponding PCT Application No. PCT/EP2022/083104, Dated Mar. 6, 2023.

Written Opinion from corresponding PCT Application No. PCT/EP2022/083104, Dated Mar. 6, 2023.

Search Report from corresponding German Application No. 10 2021 130 968.9, Dated Sep. 19, 2022.

* cited by examiner

COOLING ASSEMBLY, INSERT AND DRIVE ASSEMBLY HAVING A COOLING ASSEMBLY OF THIS KIND

CROSS-REFERENCE TO RELATED APPLICATIONS

This application is a national phase application of PCT Application No. PCT/EP2022/083104, filed on 24 Nov. 2022, which claims the benefit of and priority to German Patent Application No. 10 2021 130 968.9, filed on 25 Nov. 2021. The entire disclosures of the applications identified in this paragraph are incorporated herein by references.

The invention relates to a cooling assembly for a drive assembly—in particular in the form of a traction drive-which comprises an electrical machine, for a vehicle, in particular a motor vehicle, for cooling the electrical machine, an insert and a drive assembly, in particular a traction drive, for a vehicle, in particular a motor vehicle.

During operation of an electrical machine (electric motor), heat is generated in particular at current-conducting parts of the electrical machine. This heat can negatively influence the operation of the electrical machine and is therefore undesirable. In order to enable the most efficient and long-lasting operation of an electrical machine, it is advantageous to cool an electrical machine.

Various solutions for cooling an electrical machine are known from the prior art. For example, cooling passages for conducting a cooling medium can be provided in a cast motor housing. Here, the cooling passages are arranged as close as possible to a stator of the electrical machine.

Furthermore, annular notches can be provided in the motor housing, which notches are closed by means of an outer shell and can thus form a channel for conducting a cooling medium.

In such channels, the cooling medium generally has a laminar flow with which a sufficient cooling effect cannot always be achieved.

DE 10 2018 220 183 A1, DE 10 2019 202 253 A1, DE 10 2018 212 794 A1 each present cooling assemblies with features of the preamble of claim 1. DE 10 2016 210 302 A1 discloses a cooling structure having an inner wall, an outer wall and webs arranged therebetween, which webs are arranged at a defined angle to a main flow direction.

SUMMARY

It is an object of the present invention to provide a cooling assembly, an insert and a drive assembly having a cooling assembly of this kind, wherein an optimal cooling effect can be achieved and ensured by simple means.

This object is achieved by a cooling assembly for a drive assembly, in particular in the form of a traction drive, which comprises an electrical machine, for a vehicle, in particular a motor vehicle, for cooling the electrical machine, with the features of claim 1.

The cooling assembly comprises a cooling channel for conducting a cooling medium. The cooling medium (cooling fluid, coolant) may be a gas and/or a liquid. In the case of an embodiment as a liquid, the cooling medium can contain water and optionally one or more components, e.g., propylene glycol. The cooling medium can be a mixture of water and propylene glycol, e.g., 50% water and 50% propylene glycol.

The cooling channel has an inlet for introduction of the cooling medium into the cooling channel. The cooling channel also has an outlet for discharging the cooling medium from the cooling channel. The inlet and the outlet are in particular fluidically connected to one another or flow-connected.

The cooling channel has a receiving region for receiving the electrical machine. The electrical machine can be arranged and/or fastened within the receiving region (within the cooling channel). Specifically, in the receiving region, a receiving device can be arranged in the cooling channel, which receiving device is configured and/or intended to receive, in particular to hold and fasten, the electrical machine.

The cooling medium can flow around the receiving region and in particular the electrical machine arranged in the receiving region of the cooling channel, in particular the outer side of a stator of the electrical machine. The receiving region can surround the electrical machine (in particular radially outwardly). The cooling channel can surround the receiving region or the electrical machine (in particular radially outwardly).

The cooling assembly has an insert with at least one insertion part for generating turbulence (flow vortices) in the cooling medium within the cooling channel. A turbulent flow can be generated from a laminar flow by means of the insertion part.

The insert is arranged (with its insertion part or its insertion parts) within the cooling channel in a space (in particular, an annular space) surrounding the receiving region for the electrical machine (radially outside). In particular, the insert is arranged within the cooling channel in a space (in particular, an annular space) surrounding the electrical machine (radially outside). In other words, the insert can be arranged between the inner wall or the inner circumference of the cooling channel (designed, for example, as a pipe guide) and the outer wall or the outer circumference of the receiving region for the electrical machine or of the electrical machine.

The insertion part of the insert is designed in two parts.

In the present case, a fluidic connection or flow connection means that a gas and/or a fluid (liquid) can flow between two fluidically coupled elements or between two elements that are in fluidic connection.

In the present case, "axially" or "axial direction" means a direction oriented along the central longitudinal axis of the electrical machine or parallel to the central longitudinal axis of the stator and/or of the rotor of the electrical machine. In other words, the central longitudinal axis of the electrical machine is oriented in the axial direction.

Accordingly, "radially" or "radial direction" means a direction oriented perpendicularly to the central longitudinal axis of the electrical machine and originating at the central longitudinal axis of the electrical machine.

The two-part insertion part, which is used in particular for flow guidance, is particularly simple to manufacture. By means of the two-part insertion part, the flow-conducting and flow-influencing contour of the insertion part can be individually designed and adapted. This allows the greatest possible design freedom of the insertion part per se or of the insert as a whole.

As already indicated above, the cooling assembly has an insert with at least one insertion part for generating turbulence in the cooling medium within the cooling channel. In the simplest case, the two-part insertion part by itself or as a whole forms the insert (to be inserted into the cooling channel). However, depending on the dimensioning and/or shaping of the cooling channel, two or more two-part insertion parts can be provided, which in their entirety form the insert (to be inserted into the cooling channel).

The insertion parts may each be designed identically. It is conceivable that two two-part insertion parts, two insert halves so to speak, in their entirety form the insert. Such an insert can be designed to be hollow-cylindrical (in particular in the form of a hollow circular cylinder).

Furthermore, according to the invention, the insertion part comprises a first element. The first element has a plurality of first depressions and/or elevations for generating flow vortices (first structural elements). The first depressions and/or elevations each have a cruciform design (cross-like shape). In other words, the first depressions and/or elevations are each designed to be cruciform, in particular plus-shaped (in the form of a plus sign).

According to a development, the first element can have a plurality of second depressions and/or elevations for generating flow vortices (second structural elements). The second depressions and/or elevations can each have a preferably T-shaped design (T-like shape). In other words, the second depressions and/or elevations can each be designed to be T-shaped.

According to a development, the first element can have a plurality of third depressions and/or elevations for generating flow vortices (third structural elements). The third depressions and/or elevations can each have a preferably elongate, in particular cuboidal (cuboid-like shape), design. In other words, the third depressions and/or elevations can each be designed to be cuboidal.

According to a development, the first element can have a plurality of structural regions, in particular formed separately from one another. Within a structural region, the first depressions and/or elevations (first structural elements), the second depressions and/or elevations (second structural elements) and/or the third depressions and/or elevations (third structural elements) can be arranged next to one another in rows. In this case, two adjacent rows can define a flow path which extends along a flow direction through the structural region. In other words, a flow path (of the cooling medium) can extend between two adjacent rows of structural elements.

In this case, the individual first depressions and/or elevations arranged within the same row in the flow direction can each be spaced apart from one another (in particular in each case with the same distance/aperture).

The individual second depressions and/or elevations arranged within the same row in the flow direction can each be spaced apart from one another (in particular in each case with the same distance/aperture).

Likewise, the individual third depressions and/or elevations arranged within the same row in the flow direction can each be spaced apart from one another (in particular in each case with the same distance/aperture).

Each structural region can in its entirety have a rectangular shape. Between two adjacent flow paths, mixing or blending may occur, in particular due to flow vortices generated by means of the first depressions and/or elevations. As a result, heat exchange can be further optimized.

In particular, due to the contour of the first depressions and/or elevations, parallel sections can form within a flow path, in particular within all flow paths. In the parallel sections of a flow path, the flow velocity is high in comparison to the flow velocity at another point in the cooling channel.

Within a flow path, in particular in the parallel sections of a flow path, the Reynolds number may be greater than 2300. A turbulent flow can form in the flow paths, in particular in the parallel sections of the flow paths.

In particular, due to the contour of the first depressions and/or elevations, sections with apertures through to the respectively adjacent flow paths can form within a flow path, in particular within all flow paths. In the sections with apertures, (flow) vortices can form. These vortices can arise due to the flow velocity being reduced on one side (toward the side of the aperture) on account of the apertures.

According to a development, exclusively third depressions and/or elevations can be arranged in the two outermost rows. The two outermost rows are arranged, in relation to a flow direction, in particular furthest to the left and furthest to the right within the structural region.

According to a development, the rows lying between the two outermost rows can each begin (in the flow direction) with a first depression and/or elevation, which is preferably designed to be cruciform. Alternatively, the rows lying between the two outermost rows can each begin (in the flow direction) with a second depression and/or elevation, which is preferably designed to be T-shaped.

It is likewise conceivable that (e.g., in the case of a reversal of the flow direction) the rows lying between the two outermost rows each begin with a third depression and/or elevation, which is preferably designed to be elongate/cuboidal.

According to a development, the rows lying between the two outermost rows can each end (in the flow direction) with a first depression and/or elevation, which is preferably designed to be cruciform. Alternatively, the rows lying between the two outermost rows can each end (in the flow direction) with a third depression and/or elevation, which is preferably designed to be elongate/cuboidal.

It is likewise conceivable that (e.g., in the case of a reversal of the flow direction) the rows lying between the two outermost rows each end with a second depression and/or elevation, which is preferably designed to be T-shaped.

According to a development, the rows lying between the two outermost rows can each be formed, except for the first or the last depression and/or elevation arranged within the respective row, exclusively from first depressions and/or elevations (first structural elements), which are preferably designed to be cruciform. In other words, the rows lying between the two outermost rows consist essentially, i.e., for the most part, of first depressions and/or elevations, which are preferably designed to be cruciform. In this way, a multiplicity of parallel sections and sections with apertures can be formed within a single flow path.

According to a development, within two adjacent rows lying between the two outermost rows, the first depressions and/or elevations can be arranged at an offset from one another, in particular along the flow direction, i.e., along the circumferential direction in the installed position.

In particular, a row lying within the two outermost rows can be designed to be identical to a next but one row lying within the two outermost rows, in particular without an offset from one another.

The first elevations and/or depressions in adjacent rows can have an offset from one another. This offset can be a defined dimension, for example a half first elevation and/or depression (a half first structural element, e.g., a "half cross-length").

According to a development, a structure-free region can be arranged between two structural regions which are adjacent in particular along the flow direction, i.e., along the circumferential direction in the installed position.

A structure-free region is in particular free of first, second and third depressions and/or elevations (profile elements). In other words, no first, second or third depressions and/or elevations are in particular arranged within the structure-free region. The structure-free region can in its entirety have a rectangular shape.

The flow velocity can be reduced within the structure-free region. The flow paths preferably open into the structure-free region. Within the structure-free region, flow velocity differences of the individual flow paths opening into the structure-free region can be at least largely compensated.

According to a development, the inlet and/or the outlet can be configured in such a way that the inlet and/or the outlet each open into a structure-free region of the first element. In this case, the inlet and the outlet can be arranged opposite one another in relation to the insertion part (circular or hollow-cylindrical design in the installed position). Alternatively, the inlet and/or the outlet can open between two first elements (in the case of an insert with at least two insertion parts).

Furthermore, according to the invention, the insertion part comprises a second element. The second element can be configured as a support body for the first element and/or for the electrical machine. The second element can in particular be shaping for the first element. The second element can be designed in one piece.

The first element can be designed to be dimensionally unstable (pliable) and the second element can be designed to be dimensionally stable (but flexible; resilient). The second element can be shaping for the insertion part. In particular, the insertion part is designed to be dimensionally stable (but flexible; resilient) due to the second shaped element. This allows the simplest possible installation into the cooling assembly. Moreover, via the second element the electrical machine can be supported radially outwardly relative to the wall of the cooling channel.

Since the second element in particular ensures the dimensional stability of the insertion part, the thickness of the first element can be further reduced. As a result, the first element can be designed to be thinner than a first element that would be dimensionally stable.

According to a development, the first element can be designed as a deep-drawn part. In other words, the first element can be produced by a deep-drawing process, in particular using negative pressure (vacuum).

By means of the deep-drawing process, the first element can be produced as simply as possible and thereby be provided with desired contours (depressions and/or elevations) (similarly to a chocolate insert). In particular, the thickness of the first element can be varied in a simple manner.

The second element can be designed as an injection-molded part. In other words, the second element can be produced by an injection-molding process. The second element can be designed to be (essentially) flat (planar). The second element can be produced as simply as possible by means of the injection-molding process.

The production of the first element by means of the injection-molding process would be substantially more complex in particular due to the depressions and/or elevations.

The first element and/or the second element can each be made of plastic. The plastic may be a thermoplastic.

The first element and the second element can be connected to one another by means of a clip connection. The first and second elements can be detachably connected to one another.

Alternatively or additionally, the first element and the second element can be connected to one another by means of an adhesive or welded connection. The first element and the second element can thus be connected to one another non-detachably (integrally bonded).

It is conceivable that the first element and the second element are first connected (pre-fastened) to one another by means of a detachable connection (e.g., clip connection) and are subsequently connected (finally fastened) to one another by means of a non-detachable (integrally bonded) connection (e.g., adhesive or welded connection).

It is conceivable that the insert can be designed like a collar. In an open state, the at least one insertion part of the insert can have a first end and a second end. In a closed state, the two ends can be connected to one another (one insertion part forms the collar-like insert) or to corresponding ends of a further insertion part (one insertion part and a further insertion part (e.g., two insert halves) forming in their entirety the collar-like insert) so that the insert can be designed to be hollow-cylindrical.

The two ends of the insertion part or the mutually corresponding ends of the insertion part and the further insertion part can be connected to one another, in particular in the closed state, by means of a welded connection and/or a clip connection. In particular, the insertion part (one insertion part as insert) or the insertion part and the further insertion part (both parts forming the insert) in the state of insertion in the cooling channel are present in the closed state (i.e., hollow-cylindrical).

In the inserted state, the insertion part (one insertion part as insert) or the insertion part and the further insertion part (both parts forming the insert) can in particular at least partially, in particular completely, in particular concentrically (coaxially), surround the receiving region of the electrical machine (or the electrical machine).

The insertion part and/or the further insertion part can each have at least one clip (a lug) at the first end and at least one groove, corresponding to the clip, at the second end. The clip and the groove can each be arranged at mutually corresponding positions at the two ends.

In the closed state, the clip and the groove can be arranged in a form-fitting engagement with one another. In addition, the clip and the groove can be arranged at least partially in a force-fitting engagement with one another. The insertion part (one insertion part as insert) or the insert and the further insertion part (both parts form the insert) can be held (fastened) in the closed state in particular due to the form-fitting (or partially force-fitting) engagement (clip connection).

The connection of the two ends of the insertion part or of the insertion parts in the closed state (clip connection) can be released again by the form-fitting (or partially force-locking) engagement being released again through application of a force (e.g., by pulling apart the relevant ends).

For (re-)establishing the form-fitting (or partially force-fitting) engagement between the clip and the groove, the clip is pressed into the groove corresponding to the clip, by the application of a force (e.g., by pressing together the two ends of the insertion part or the relevant ends of the insertion parts).

It is likewise conceivable that the two ends of the insertion part or the relevant ends of the insertion parts are additionally or alternatively glued or welded to one another. In other words, the two ends of the insertion part or the relevant ends of the insertion parts can be connected to one another non-detachably (integrally bonded) by means of an adhesive or welded connection.

In the state of the insert when inserted in the cooling channel, the first element can be arranged between the second element and the receiving region for the electrical machine (or of the electrical machine). In particular, the second element can surround the first element, possibly concentrically (coaxially), in particular radially outwardly.

In the state of the insert when inserted in the cooling channel, the second element can rest at least partially, in particular completely, against an inner wall of the cooling channel. The inner wall of the cooling channel can delimit the space which surrounds the receiving region for the electrical machine (or of the electrical machine) (radially) outwardly.

In particular, the second element can rest against the inner wall of the cooling channel in such a way that no cooling medium can flow between the second element and the inner wall of the cooling channel. This can prevent a laminar flow from forming between the inner wall of the cooling channel and the (flat) second element (since the second element in particular does not have any elevations and/or depressions).

Moreover, this can ensure that the entire cooling medium flowing through the cooling channel is conducted between the second element and the receiving region for the electrical machine (or of the electrical machine). Since the second element has, in particular, elevations and/or depressions, which cause flow vortices, it can be ensured in this way that the entire cooling medium is converted into the turbulent flow.

Regardless of this, the second element can be designed in such a way that the elevations and/or depressions thereof can be dimensioned in such a way that the second element rests at least in sections, in particular with its elevations, against the housing of the electrical machine. This contributes to a particularly strong turbulent flow.

The aforementioned object is also achieved by an insert for a cooling assembly with one or more of the aspects described above, wherein the insert has at least one insertion part, in particular two insertion parts. With regard to the advantages that can be achieved thereby, reference is made to the statements made in this respect about the cooling assembly.

The at least one insertion part can be designed in two parts.

The insertion part can have at least one of the features described above.

For the further design of the insert or of the insertion part(s) that form the insert, the measures described above in connection with the cooling assembly and/or the measures explained below can be used.

The aforementioned object is furthermore achieved by a drive assembly, in particular a traction drive, for a vehicle, in particular a motor vehicle, having the features of the further independent claim. The drive assembly comprises an electrical machine and a cooling assembly according to the above statements.

With regard to the advantages that can be achieved thereby, reference is made to the statements made in this respect about the cooling assembly. For the further design of the drive assembly, the measures described in connection with the cooling assembly and/or the measures explained below can be used.

BRIEF DESCRIPTION OF THE DRAWINGS

Further features, details and advantages of the invention emerge from the wording of the claims and from the following description of exemplary embodiments with reference to the drawings. In the drawings:

DETAILED DESCRIPTION

In the following description and in the figures, corresponding components and elements bear the same reference signs. For improved clarity, not all reference signs are reproduced in all figures.

Figure 1:
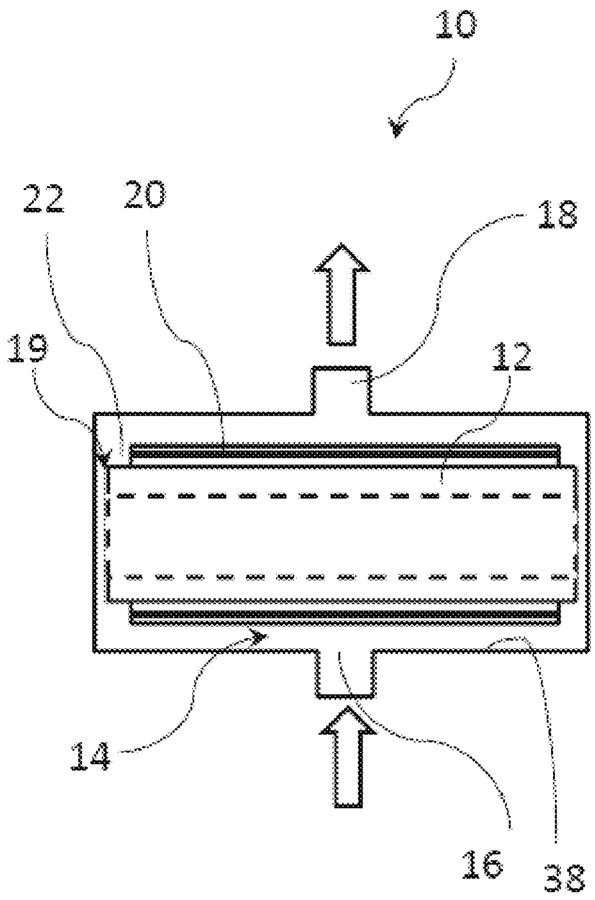
FIG. 1 shows a schematic sectional view of a cooling assembly.

FIG. 1 shows a schematic sectional view of a cooling assembly 10. The cooling assembly 10 has a cooling channel 14 for conducting a cooling medium. The cooling channel 14 has an inlet 16 for introducing the cooling medium into the cooling channel 14 (indicated by an arrow in FIG. 1). The cooling channel 14 also has an outlet 18 for discharging the cooling medium from the cooling channel 14 (likewise indicated by means of an arrow in FIG. 1).

The cooling medium thus passes through the inlet 16 into the cooling channel 14, flows along the cooling channel 14 (from bottom to top in FIG. 1) and is discharged from the cooling channel 14 through the outlet 18.

A receiving region 19 for receiving an electrical machine 12 is arranged within the cooling channel 14 (shown only schematically). In the present case, the electrical machine 12 is arranged within the receiving region 19 and within the cooling channel 14. A receiving device (not shown) configured to receive the electrical machine 12 can be arranged in the receiving region 19.

An insert 20 is arranged within the cooling channel 14. The insert 20 is arranged in the space 22 which surrounds the receiving region 19 or the electrical machine 12 radially outwardly.

In the present case, this space 22 is designed as an annular space between the receiving region 19 or the electrical machine 12 and an inner wall 38 which delimits the cooling channel 14 radially outwardly.

In the present case, the electrical machine 12, the receiving region 19 of the electrical machine 12, the insert 20, and the inner wall 38 of the cooling channel 14 are arranged coaxially with one another. The components mentioned overlap one another along the axial direction.

Figure 2:
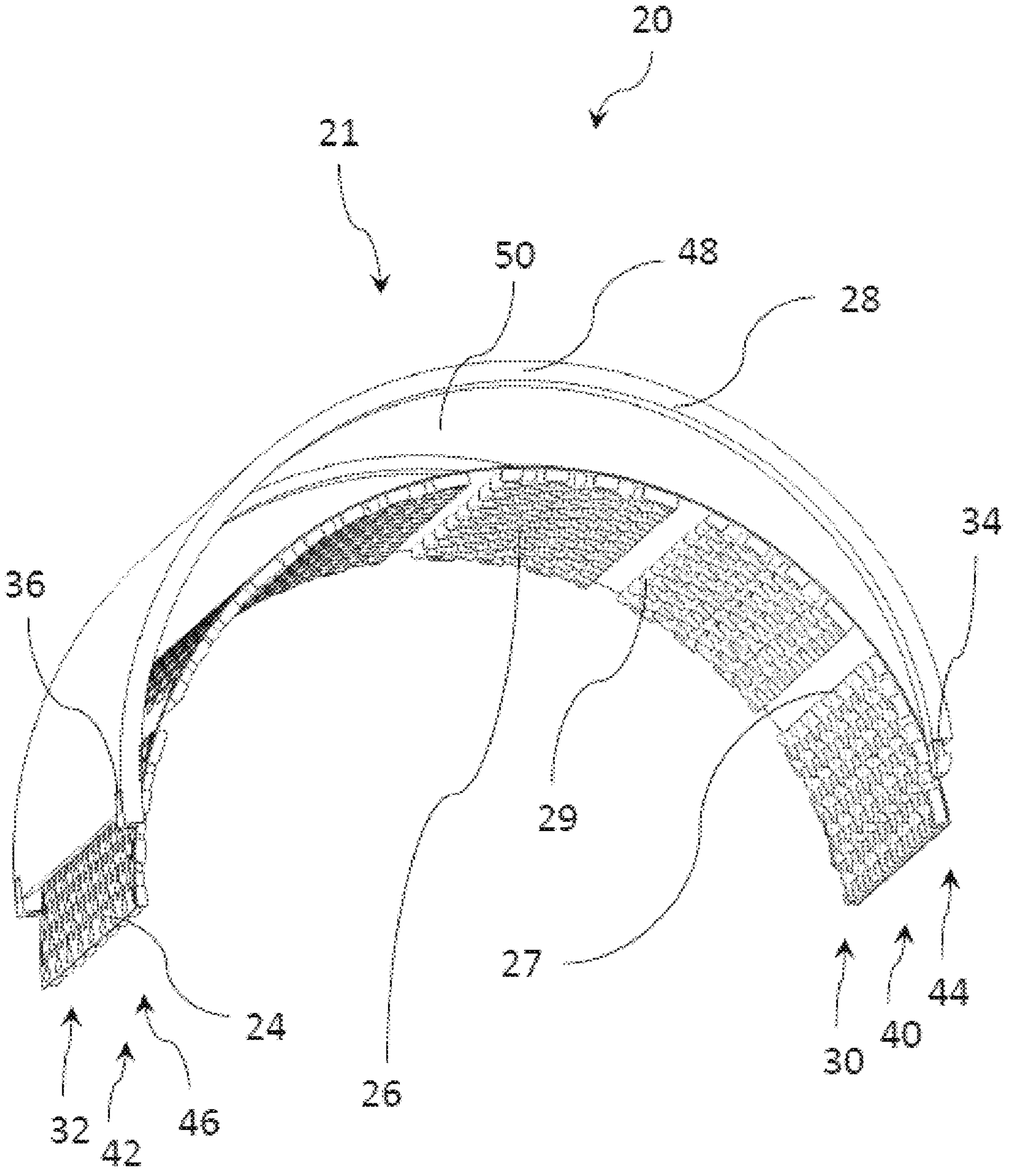
FIG. 2 is an exploded view of an insert of the cooling assembly.

FIG. 2 shows an exploded view of the insert 20. The insert 20 has one or more insertion parts 21, only one insertion part 21 being shown here by way of example. The insertion part 21 has a first element 24 and a second element 28.

In the present case, the first element 24 has a plurality of first elevations 26, a plurality of second elevations 27 and a plurality of third elevations 29, wherein these structural elements each contribute to the generation of flow vortices.

The first element 24 is designed as a deep-drawn part. By means of a deep-drawing process, the first elevations 26, the second elevations 27 and the third elevations 29 of the first element 24 can be simply produced in the desired shape, size and arrangement.

In the present case, the second element 28 is designed as an injection-molded part. The second element 28 has no elevations 26, 27, 29. In other words, apart from reinforcement regions or edge strips 48 (see below), the second element 28 is essentially flat (planar). Such a shape can simply be produced by means of the injection-molding process.

The insertion part 21 is designed like a collar. In the present case, the insertion part 21 is shown in an open state. The insertion part 21 has a first end 30 and a second end 32. Accordingly, the first element 24 has a first end 40 and a second end 42. Likewise, the second element 28 also has a first end 44 and a second end 46.

In a closed state, the two ends 30, 32 of the insertion part 21 can be connected to one another or to corresponding ends of a further insertion part (not shown) (designed analogously to the insertion part 21). Regardless of whether the insert 20 is formed from only one insertion part 21 or from the insertion part 21 and a further insertion part 21, the insert 20 in the closed state (relevant ends are connected to one another) assumes a hollow-cylindrical shape (not shown).

In a state of the insert 20 mounted (inserted) in the cooling assembly 10, the insertion part(s) 21 are present in the closed state. The insertion part(s) 21 are already transferred into the closed state for assembly or insertion into the cooling assembly 10.

For this purpose, the second element 28 in each case has two clips 34 at the first end 44. At the second end 46, the second element 28 in each case has two grooves 36 corresponding to the respective clips 34. The clips 34 and the grooves 36 form a releasable clip connection.

The clips 34 and the grooves 36 can be brought into form-fitting engagement with one another by the application of a force (e.g., by pressing together the two ends 44, 46 of the second element 28). The clips 34 and the grooves 36 remain in engagement and hold the second element 28 and thus the insertion part 21 in the closed state.

In order to release this clip connection, the two ends 44, 46 of the second element 28 are moved away from one another by the application of a force (e.g., by pulling apart the two ends 44, 46) until the form-fitting engagement between the clips 34 and the grooves 36 is released again.

In the closed state and in the state when inserted in the cooling assembly 10, the second element 28 surrounds the first element 24 radially outwardly.

In the present case, the second element 28 has two reinforcement regions 48 or edge strips which each extend from a clip 34 to the respectively corresponding groove 36 along the edge of the second element 28. The reinforcement regions 48 have a greater thickness than the remaining planar body 50 of the second element 28.

The stability of the second element 28 and thus the stability of the insertion part 21 can be increased by the reinforcement regions 48 thicker than the planar body 50.

Moreover, the reinforcement regions 48 serve as a securing device for the first element 24. The first element 24 is delimited by the reinforcement regions 48 of the second element 28 in an assembled state of the insertion part(s) 21 and thus fastened in the axial direction.

Figure 3:
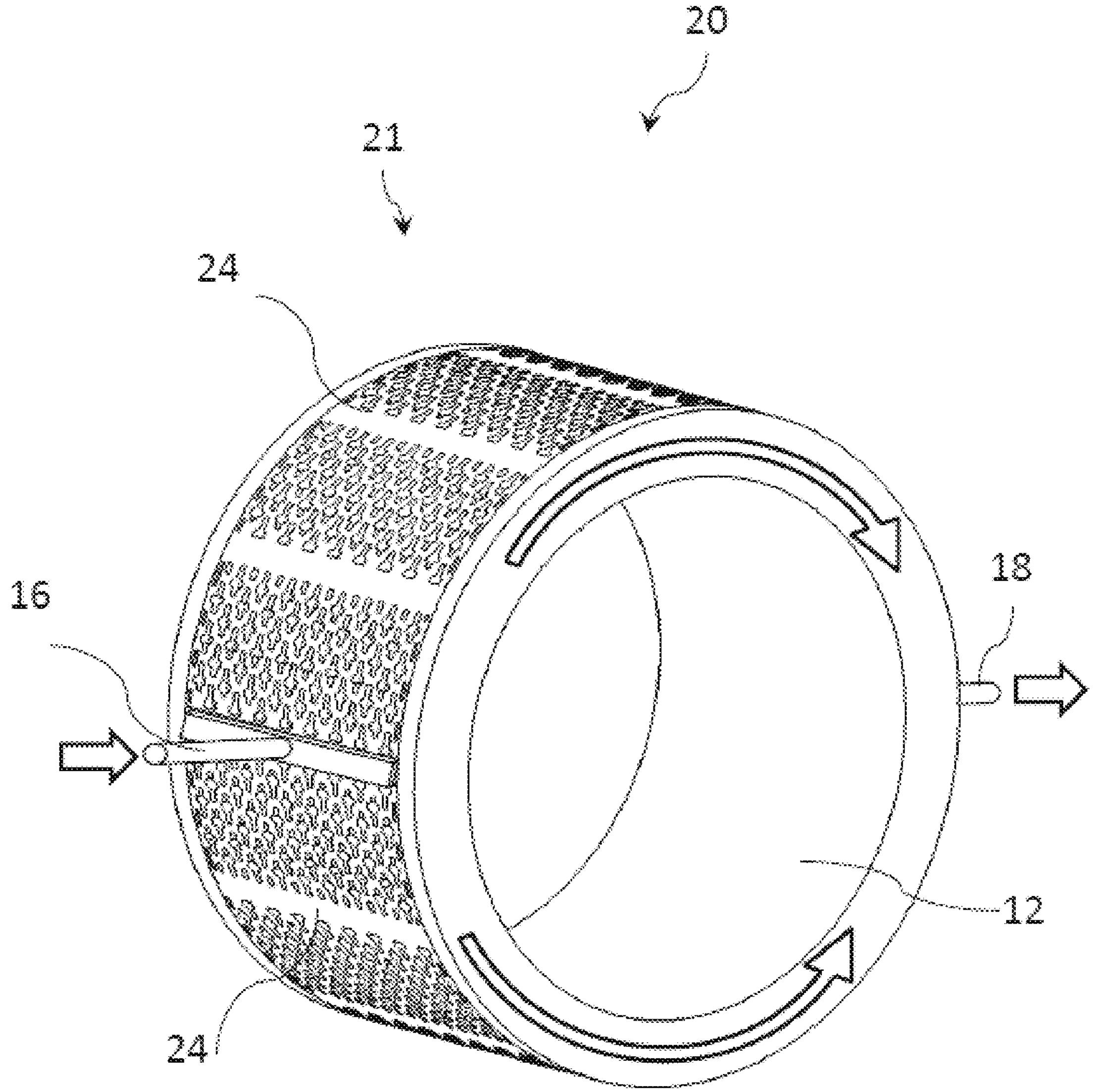
FIG. 3 shows a perspective view of the insert according to FIG. 2 in an inserted state, wherein the second element of the insert is omitted.

FIG. 3 shows a perspective view of the insert 20 in an inserted state, wherein the second elements 28 are omitted for greater clarity. The insert 20 in the present case has two insertion part(s) 21. These insertion part(s) 21 can each be an insertion part according to FIG. 2 (second elements 28 omitted for greater clarity). In this case, the two insertion part(s) 21 are assembled to form a hollow-cylindrical structure.

In the present case, the insert 20 thus has two first elements 24 and two second elements 28 (not shown in FIG. 3). The inlet 16 through which the coolant is introduced into the cooling channel 14 (indicated by a straight arrow) opens in the present case between the two first elements 24.

The cooling medium flows along the cooling channel 14 from the inlet 16 to the outlet 18. This is indicated in FIG. 3 by means of two curved arrows.

The outlet 18 through which the coolant is discharged from the cooling channel 14 (likewise indicated by a straight arrow) is arranged opposite the inlet 16 and likewise opens between the two first elements 24. In FIG. 3, a first element 24 is thus arranged above the inlet 16 and the outlet 18 and a further first element 24 is arranged below the inlet 16 and the outlet 18.

The two first elements 24 can enclose a radially inward electrical machine 12, which is merely schematically indicated in the present case. The cooling channel thus extends at least partially in the circumferential direction of the electrical machine 12. The cooling medium flows around the electrical machine 12 on its outer circumference.

Figure 4:
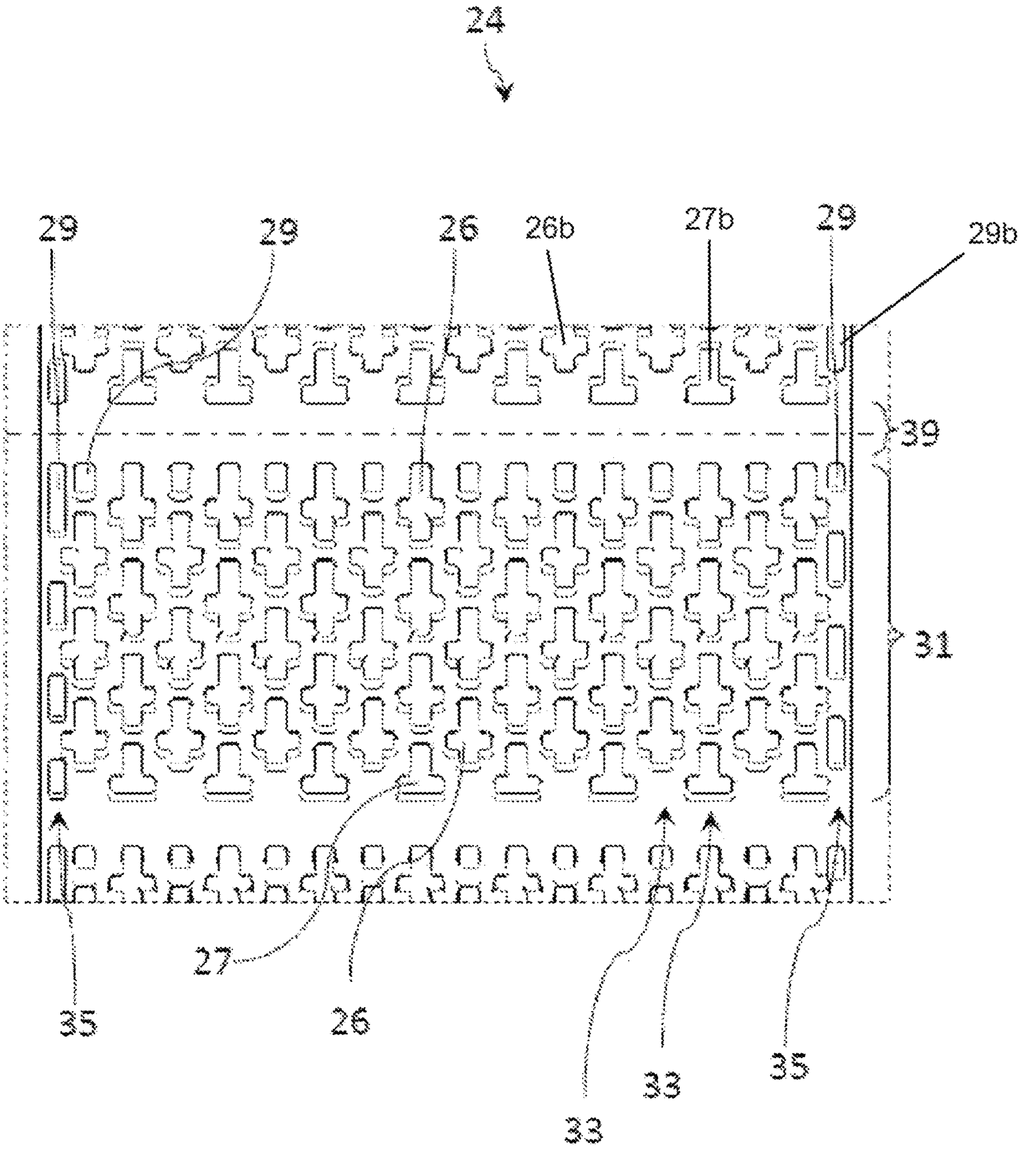
FIG. 4 shows a detail of a view from radially inside onto the first element of the insert.

FIG. 4 shows a detail of a view from radially inside onto the first element 24 (developed view). The first element 24 has a plurality of separate structural regions 31. They are each designed to be rectangular in their entirety. A structure-free region 39 is arranged between two structural regions 31. Within the structure-free regions 39, as already indicated by the name, no structures and in particular no first, second and/or third elevations 26, 27, 29 are arranged. Corresponding to the first elevations 26, the second elevations 27, and the third elevations 29 in the focused middle structural region 31, first depressions **26*b*, second depressions 27*b* and third depressions 29*b* are shown on the first element 24 in the upper structural region 31**.

The first, second and third elevations 26, 27, 29 are arranged within the middle structural region 31. They are arranged in rows 33, 35 which are oriented along the flow direction (along the circumferential direction in the present case).

The first elevations 26 each have a cruciform design. The second elevations 27 each have a T-shaped design. The third elevations 29 each have an elongate, cuboidal design.

The two outermost rows 35 (arranged in FIG. 4 furthest to the left and furthest to the right) are each formed by the third elevations 29. The rows 33 lying between the two outermost rows 35 are for the most part formed from first elevations 26.

In this case, the rows 33 lying between the two outermost rows 35 each begin alternately with a first elevation 26 or a second elevation 27. The rows 33 lying between the two outermost rows 35 each end alternately with a first elevation 26 or a third elevation 29. In the present case, each row 33 that begins with a first elevation 26 ends with a third elevation 29. Each row 33 that begins with a second elevation 27 ends with a first elevation 26.

Each row 33 lying within the two outermost rows 35 therefore has, except for the first or last element, exclusively first elevations 26, which are designed in the form of a cross.

The first elevations 26 of each two adjacent rows 33 are arranged at an offset from one another in the flow direction.

Figure 5:
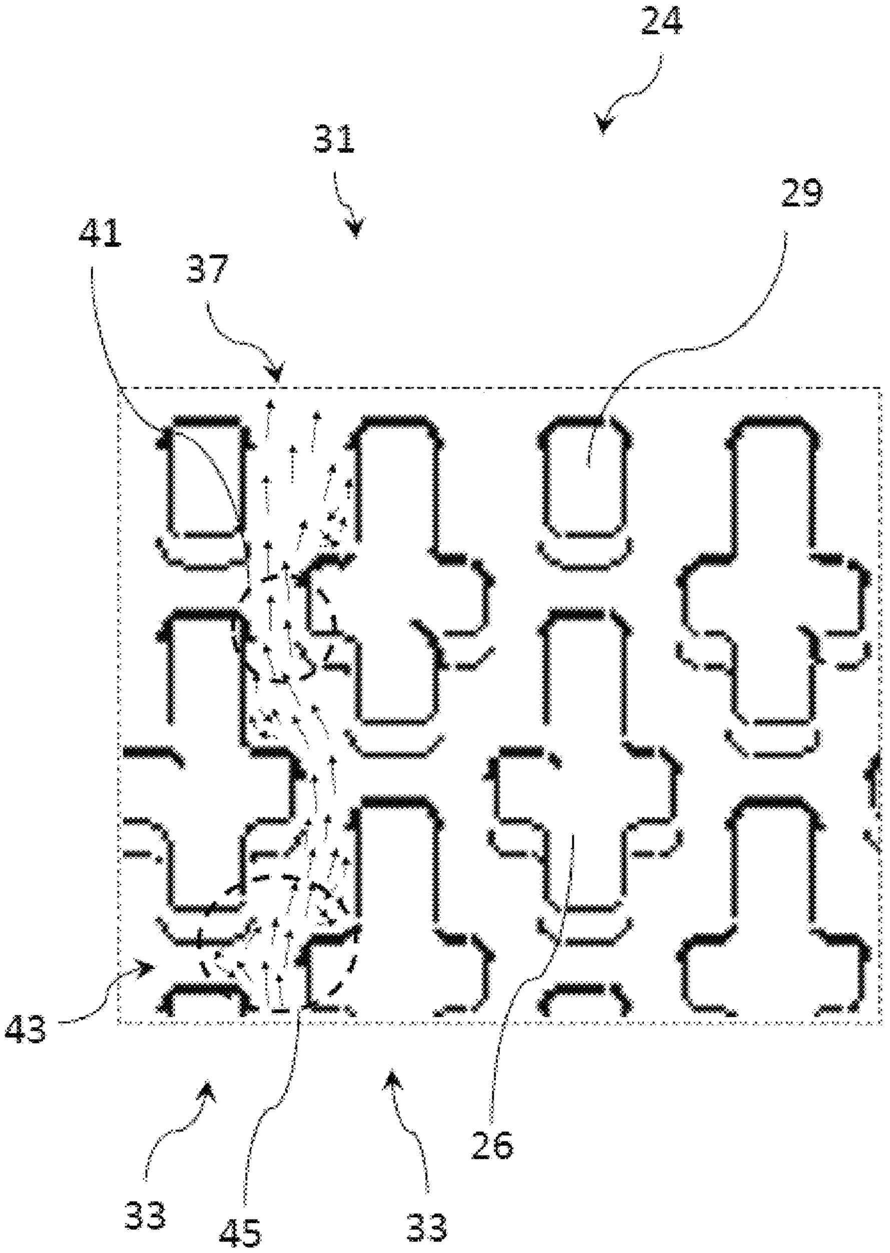
FIG. 5 shows a detail from FIG. 4 with a flow path shown.

FIG. 5 shows a detail from FIG. 4 with a flow path 37 shown. Two rows 33, 35 in each case delimit or define a flow path 37. In particular due to the shape or design of the first elevations 26, the cooling medium is forced along the flow path 37 in a "slalom course."

Parallel regions 41 are formed within the flow path 37, in which regions a high flow velocity can be achieved in comparison to another point in the flow path 37.

Within a row, the first elevations 26 are spaced apart from one another so that apertures 43 are formed which fluidically connect two adjacent flow paths 37 to one another (in particular transversely to the flow direction). Within a flow path 37, sections 45 can form in which (flow) vortices can form in particular due to the apertures 43. These vortices are able to arise due to the flow velocity being reduced on one side (toward the side of the aperture). These vortices contribute to better mixing of the cooling medium and thus to better heat transfer.

What is claimed is:

1. A cooling assembly for cooling an electrical machine of a drive assembly for a vehicle, the cooling assembly comprising:

a cooling channel for conducting a cooling medium with an inlet for introducing the cooling medium into the cooling channel and with an outlet for discharging the cooling medium from the cooling channel, wherein the cooling channel has a receiving region for receiving the electrical machine, wherein the cooling assembly comprises an insert with at least one insertion part for generating turbulence of the cooling medium within the cooling channel, wherein the insert is arranged in a space surrounding the receiving region for the electrical machine, within the cooling channel, wherein the insertion part has a two-part design, and the insertion part comprises a first element and a second element, wherein the first element has first depressions and/or elevations for generating flow vortices, wherein the first depressions and/or elevations are arranged next to one another in rows, wherein two adjacent rows of the rows define a flow path, wherein at least one of the rows comprises a plurality of the first depressions and/or elevations, and wherein the plurality of the first depressions and/or elevations of the at least one of the rows each have a cruciform design in the form of a plus sign.

2. The cooling assembly according to claim 1, wherein the first element has a plurality of second depressions and/or elevations for generating flow vortices, wherein the second depressions and/or elevations each have a preferably T-shaped design.

3. The cooling assembly according to claim 1, wherein the first element has a plurality of third depressions and/or elevations for generating flow vortices, wherein the third depressions and/or elevations each have a preferably elongate, in particular cuboidal, design.

4. The cooling assembly according to claim 1, wherein the first element has a plurality of structural regions, wherein within a structural region, the first depressions and/or elevations, second depressions and/or elevations and/or third depressions and/or elevations are arranged next to one another in rows, wherein two adjacent rows define a flow path through the structural region.

5. The cooling assembly according to claim 4, wherein exclusively third depressions and/or elevations are arranged in the two outermost rows.

6. The cooling assembly according to claim 4, wherein the rows lying between the two outermost rows each begin with a first depression and/or elevation or a second depression and/or elevation.

7. The cooling assembly according to claim 4, wherein the rows lying between the two outermost rows each end with a first depression and/or elevation or a third depression and/or elevation.

8. The cooling assembly according to claim 4, wherein the rows lying between the two outermost rows are each formed, except for the first and the last depression and/or elevation arranged within the respective row, exclusively from first depressions and/or elevations.

9. The cooling assembly according to claim 4, wherein within two adjacent rows lying between the two outermost rows, the first depressions and/or elevations are arranged at an offset from one another.

10. The cooling assembly according to claim 4, wherein a structure-free region is arranged between two adjacent structural regions.

11. The cooling assembly according to claim 10, wherein the inlet and/or outlet are configured in such a way that the inlet and/or outlet each open into a structure-free region or between two adjacent first elements.

12. The cooling assembly according to claim 1, wherein the second element is configured as a support body for the first element and/or for the electrical machine.

13. The cooling assembly according to claim 1, wherein the first element is designed as a deep-drawn part and/or that the second element is designed as an injection-molded part.

14. The cooling assembly according to claim 1, wherein the at least one insertion part includes two insert parts.

15. A drive assembly for a vehicle, the drive assembly comprising:

an electrical machine; and a cooling assembly, wherein the cooling assembly comprises a cooling channel for conducting a cooling medium with an inlet for introducing the cooling medium into the cooling channel and with an outlet for discharging the cooling medium from the cooling channel, wherein the cooling channel has a receiving region for receiving the electrical machine, wherein the cooling assembly comprises an insert with at least one insertion part for generating turbulence of the cooling medium within the cooling channel, wherein the insert is arranged in a space surrounding the receiving region for the electrical machine, within the cooling channel, wherein the insertion part has a two-part design, and the insertion part comprises a first element and a second element, wherein the first element has first depressions and/or elevations for generating flow vortices, wherein the first depressions and/or elevations are arranged next to one another in rows, wherein two adjacent rows of the rows define a flow path, wherein at least one of the rows comprises a plurality of the first depressions and/or elevations, and wherein the plurality of the first depressions and/or elevations of the at least one of the rows each have a cruciform design in the form of a plus sign.

* * * * *